United States Patent
Kwon et al.

(10) Patent No.: US 8,596,675 B2
(45) Date of Patent: Dec. 3, 2013

(54) DUAL CHAMBER SIDE AIR BAG APPARATUS FOR VEHICLE

(75) Inventors: Hyock In Kwon, Seongnam-si (KR); Hyeong Ho Choi, Gwangmyeong-si (KR); Dae Young Kwak, Yongin-si (KR); Tae Ik Gwon, Hwaseong-si (KR); Soon Bok Lee, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/542,409

(22) Filed: Jul. 5, 2012

(65) Prior Publication Data

US 2013/0147167 A1 Jun. 13, 2013

(30) Foreign Application Priority Data

Dec. 7, 2011 (KR) ........................ 10-2011-0130078

(51) Int. Cl.
*B60R 21/207* (2006.01)
*B60R 21/2338* (2011.01)

(52) U.S. Cl.
USPC ................ 280/730.2; 280/729; 280/743.2; 297/216.13

(58) Field of Classification Search
USPC ............ 280/729, 730.1, 730.2, 743.1, 743.2; 297/216.13
See application file for complete search history.

(56) References Cited

U.S. PATENT DOCUMENTS

| | | | | |
|---|---|---|---|---|
| 6,749,218 B2 * | 6/2004 | Breed | .......................... | 280/735 |
| 6,755,273 B2 * | 6/2004 | Breed | .......................... | 180/274 |
| 6,802,529 B2 * | 10/2004 | Takedomi et al. | ............ | 280/729 |
| 6,896,325 B2 * | 5/2005 | Takedomi et al. | ......... | 297/216.1 |
| 7,334,813 B2 * | 2/2008 | Mellor | ....................... | 280/730.2 |
| 7,681,907 B2 * | 3/2010 | Svenbrant et al. | ......... | 280/728.2 |
| 7,819,423 B2 * | 10/2010 | Loibl et al. | ................. | 280/730.2 |
| 8,459,690 B2 * | 6/2013 | Breuninger et al. | ....... | 280/730.2 |
| 2004/0232666 A1 * | 11/2004 | Sato et al. | .................. | 280/730.2 |
| 2010/0090448 A1 * | 4/2010 | Pursche et al. | ............. | 280/730.2 |

* cited by examiner

*Primary Examiner* — Ruth Ilan
*Assistant Examiner* — Laura Freedman
(74) *Attorney, Agent, or Firm* — Morgan, Lewis & Bockius LLP

(57) ABSTRACT

A dual chamber side air bag apparatus may include an inflator mounted to a side of a seat back frame in an outdoor direction, an air bag cushion fluid-connected to the inflator and including a first chamber and a second chamber mounted at a side of the seat back frame in the outdoor direction and fluid-connected to the inflator and the first chamber to protrude and develop toward a front of the seat back frame when the inflator may be activated, for protecting side surface of the upper body of the passenger, and a tether having one end thereof fixed to the scat back frame, a raid portion thereof wrapping the first chamber, and the other end thereof sewing-coupled to the air bag cushion in a boundary of the first and second chambers to provide a directivity so that the first chamber develops toward the upper body of the passengers.

8 Claims, 4 Drawing Sheets

DUAL CHAMBER SIDE AIR BAG APPARATUS FOR VEHICLE

CROSS-REFERENCE TO RELATED APPLICATION

The present application claims priority to Korean Patent Application No. 10-2011-0130078 filed on Dec. 7, 2011, the entire contents of which is incorporated herein for all purposes by this reference.

BACKGROUND OF THE INVENTION

1. Field of the Invention

The present invention relates to a dual chamber side air bag apparatus for a vehicle, more particularly, to a dual chamber side air bag apparatus for a vehicle for achieving a weight reduction and a cost reduction by reducing the number of parts.

2. Description of Related Art

Generally, a vehicle has various air bags apparatus for protecting a safety for a passenger. Among those, there is a side air back apparatus attached to one side surface of an outdoor direction seat back 1 directing to a door trim for protecting the passengers from a side car crash as shown FIG. 1.

The conventional side air bag apparatus having a dual chamber includes a first air bag module 2 having a first inflator 2a and a first air bag cushion 2b, and a second air bag module 3 having a second inflator 3a and a second air bag cushion 3b as shown in FIG. a, wherein the first air bag cushion 2b serves to develop toward the passenger 4 and push the upper body of the passengers 4 in the indoor direction by a pressure of gas generated from the first inflator 2a just before the car crash occurs. This enables the upper body of the passenger to farthest move from an accident spot.

In addition, the second air cushion 3b protrudes and develops toward a front direction of a seat back 1 by a pressure of gas generated from the second inflator 3a on a car crash to protect a side surface of the upper body of the passengers 4.

However, the conventional dual chamber side air bag apparatus uses two air bag modules 2, 3 to results in an increase in the number of the part and a weight, particularly, a production cost.

Contents described as a technical background is to improve an understandings for the background of the present invention and thus it should not be appreciated that they have been known to those skilled in the art as a prior technical.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a dual chamber side air bag apparatus for a vehicle for simultaneously performing two modes for pushing the upper body of the passengers in an indoor direction on a side crash and protecting a side surface of the upper body of the passengers as one air bag module to achieve the number of parts, a reduction of a weight, and a cost reduction.

In an aspect of the present invention, a dual chamber side air bag apparatus may include an inflator mounted to a side of a seat back frame in an outdoor direction, an air bag cushion fluid-connected to the inflator and including a first chamber to push an upper body of a passenger in an indoor direction while developing by a pressure of gas generated from the inflator, and a second chamber mounted at a side of the seat back frame in the outdoor direction and fluid-connected to the inflator and the first chamber so as to protrude and develop toward a front of the seat back frame the inflator is activated, for protecting side surface of the upper body of the passenger, and a tether having one end thereof fixed to the seat back frame, a mid portion thereof wrapping the first chamber, and the other end thereof sewing-coupled to the air bag cushion in a boundary of the first and second chambers to provide a directivity so that the first chamber develops toward the upper body of the passengers.

The second chamber supports a side of the first chamber so that the second chamber pushes the first chamber in the indoor direction when the air bag cushion is developed.

The one end of the tether is integrally coupled to a tether bracket and the tether bracket is mounted to the seat back frame.

The tether bracket is fixed to an inner side surface of the seat back frame toward the indoor direction in the seat back frame by a fastening member.

The tether bracket is mounted to be inserted between the air bag cushion and the seat back frame so that the tether bracket is located at an outer side surface of the seat back frame toward the outdoor direction in the seat back frame, wherein the tether bracket may have a flange portion extending toward the indoor direction so as to induce a developing directivity of the first chamber toward the indoor direction.

The second chamber is larger than the first chamber.

The second chamber is supplied with a pressure higher than that of the first chamber.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
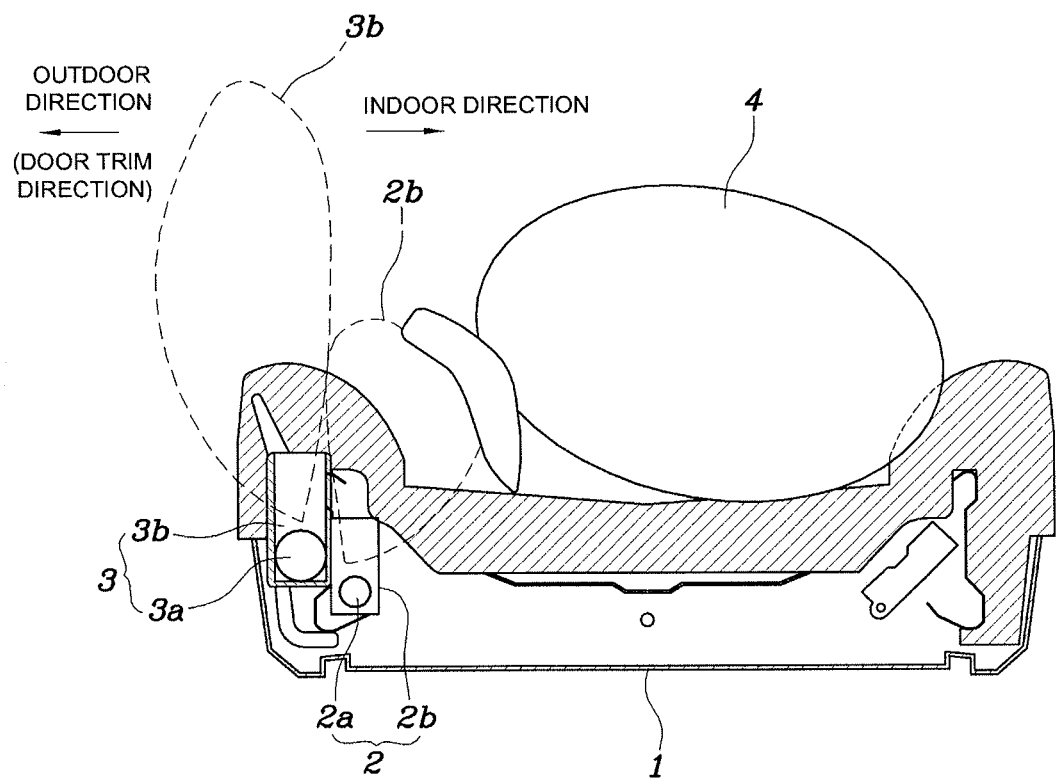
FIG. 1 is an explanation view showing a conventional dual chamber side air bag apparatus.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 2:
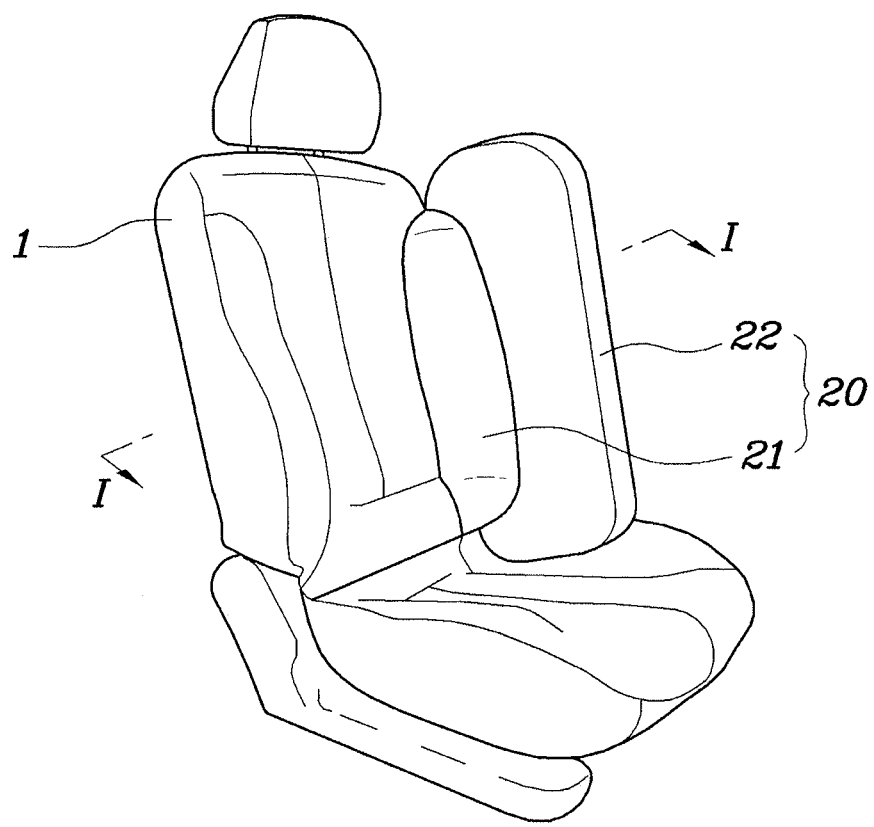
FIG. 2 is a perspective view of a seat having a dual chamber side air bag apparatus according to an exemplary embodiment of the present invention.
Figure 3:
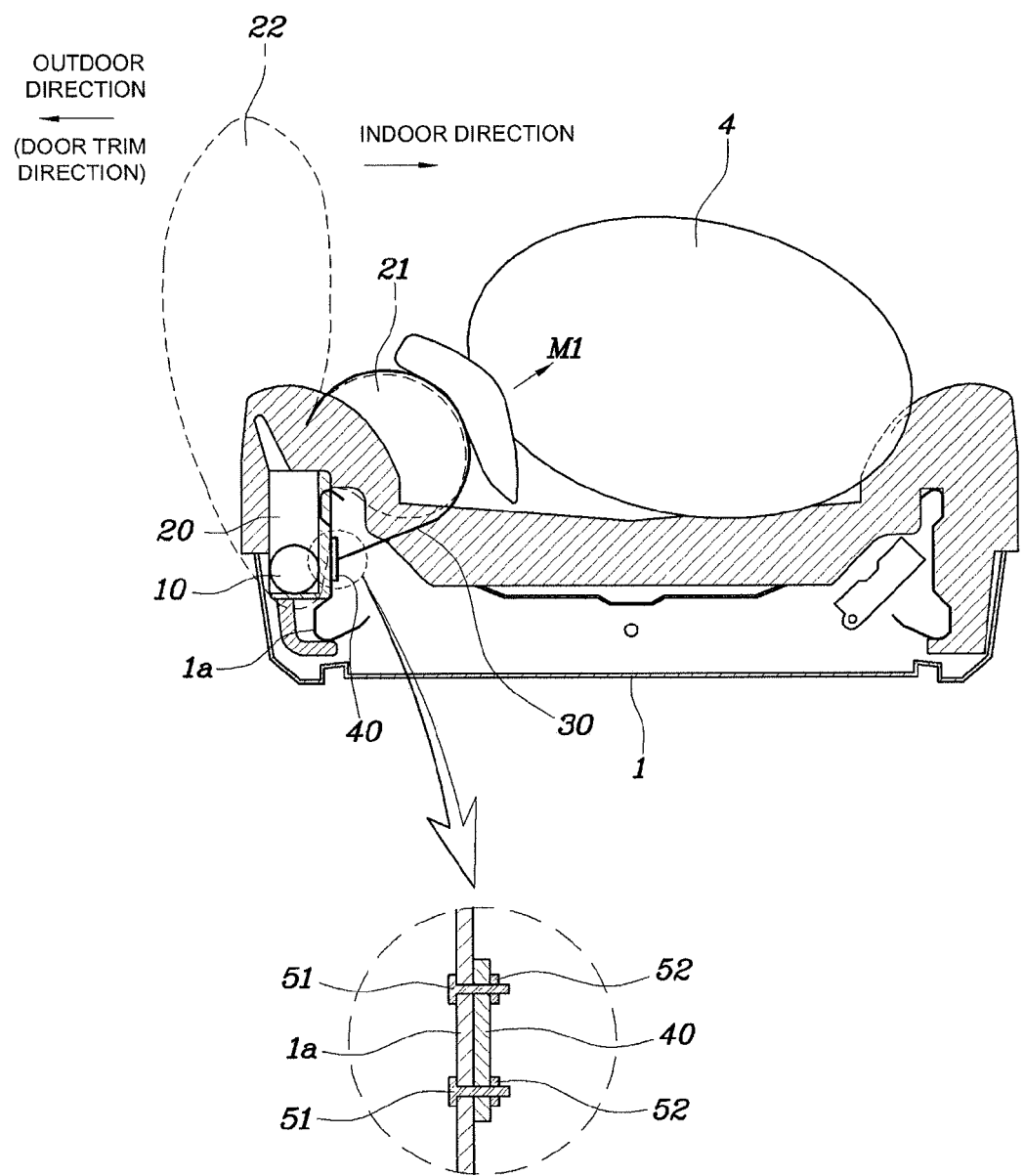
FIG. 3 is a cross-sectional view taken along line I-I of FIG. 2.

A dual chamber side air bag apparatus for a vehicle according to an exemplary embodiment of the present invention will described with reference to an accompanying drawings as shown in FIGS. 2 and 3.

A dual chamber side air bag apparatus for a vehicle includes an inflator 10 mounted to fix to one side of a seat back frame 1a in an indoor direction directing to a door trim, an air bag cushion 20 including a first chamber 21 pushing the upper body of the passengers 4 in an indoor direction (arrow M1) while developing by a pressure of gas generated from the inflator 10 and a second chamber 22 for protecting a side surface of the upper body of the passengers 4 while protruding and developing toward a front side of a seat back 1, and mounted to fix to one side of a seat back frame 1a in an outdoor direction directing to a door trim together with the inflator 10, and a tether 30 having one end thereof fixed to the seat back frame 1a in a manner that wraps the first chamber 21 and other end sewing-coupled to the air bag cushion 20 in a boundary of the first chamber 21 and second chamber 22 to provide a directivity so that the first chamber develops toward the upper body of the passengers 4.

The second chamber 22 supports the development of the first chamber 21 while the first and second chamber 21, 22 keep a close state so that the second chamber pushes the first chamber 21 in indoor direction when the air bag cushion 20 is in a developed state.

Preferably, an internal pressure of the second chamber 22 is higher than that of the first chamber 21.

As described above, the upper body of the passenger 4 moves furthest from a crash occurring position by pushing the second chamber 22 to the first chamber 21 in an indoor direction when the air bag cushion 20 develops, thereby reducing considerably the passenger' injury.

The one end of tether 30 is integrally coupled to a tether bracket 40, and the tether bracket 40 is mounted to fix the seat back frame 1a. Therefore, when the one end of the tether 30 is coupled to the seat back frame 1a via the tether bracket 40, the high coupling force of the tether 30 can be obtained, thereby keeping the developed states of the first chamber 21 stable.

Meanwhile, the tether bracket 40 has two mounting structures. A first mounting structure is a structure mounted to fix through fastening members such as a bolt 51 and a nut 52 at an inner side surface toward an indoor direction seat back frame 1a as shown FIG. 3.

The one end of the tether 30 is mounted more stable by a fastening force of the bolt 51 and the nut 52.

Figure 4:
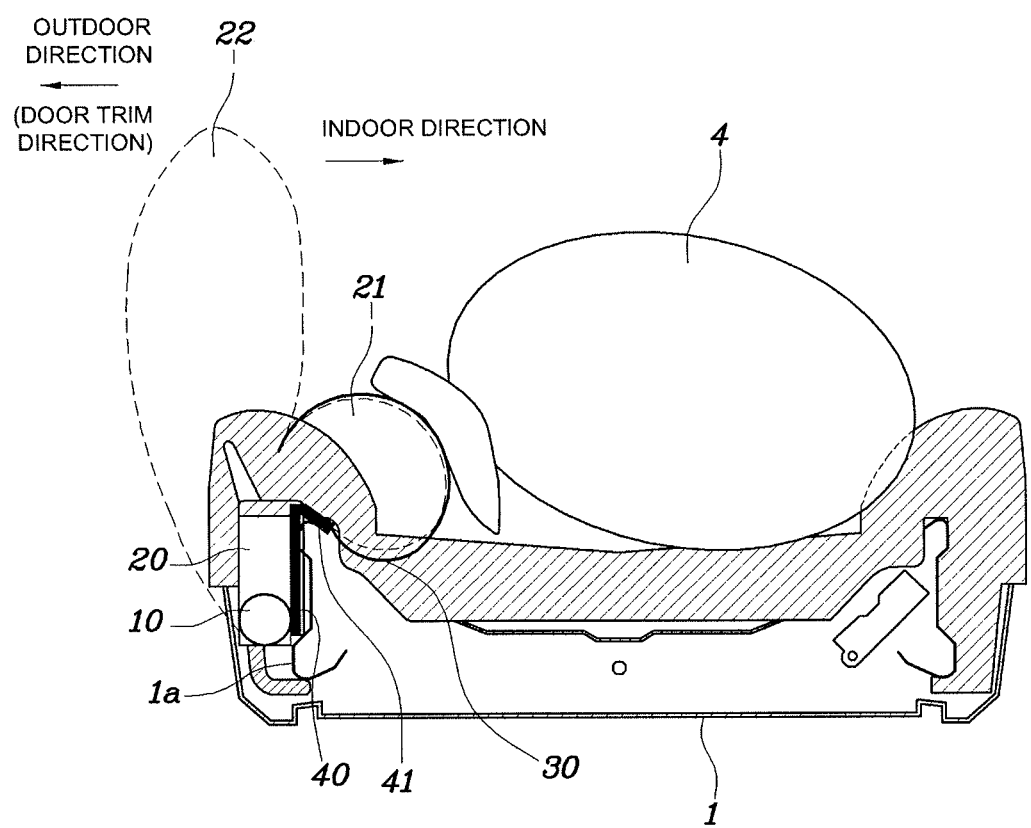
FIG. 4 is a view of another mounting structure of a tender bracket according to an exemplary embodiment of the present invention.

Another mounting structure of the tether bracket 40 is a structure inserted between the air bag cushion 20 and the seat back frame 1a to be placed at outer side surface toward the outdoor direction from the seat back frame 1a as shown in FIG. 4.

The mounting structure is a structure in which a seat back frame 1a made of steel supports the tether bracket 40. In this case, the bolt and the nut as shown in FIG. 3 are not used in mounting the tether bracket 40, thereby providing an advantage of reducing production cost.

Meanwhile, the tether bracket 40 has a flange portion 41 inducing a developing directivity of the first chamber 21, which can be formed toward the indoor direction as shown in FIG. 4.

The flange portion 41 helps in inducing a developing direction of the first chamber 21 toward an indoor.

The dual chamber side air bag apparatus for a vehicle according to an exemplary embodiment of the present invention performs simultaneously a function pushing the upper body of the passenger 4 in indoor direction on a side crash by using one inflator 10 and one air bag cushion 20 and, a function for protecting a side surface of the upper body of the passengers 4, thereby achieving a weight reduction, the number of the parts and a production cost compared with the conventional apparatus.

In addition, the upper body of the passenger 4 moves furthest from a crash occurring position by pushing the second chamber 22 to the first chamber 21 in a indoor direction when the air bag cushion 20 develops, thereby reducing considerably the passenger' injury.

The dual chamber side air bag apparatus for a vehicle according to an exemplary embodiment of the present invention performs simultaneously a function pushing the upper body of the passenger in indoor direction on a side crash by using one inflator and one air bag cushion and, a function for protecting a side surface of the upper body of the passengers, thereby reduce the number of parts and achieving a weight reduction and a reduction of production cost. In addition, the upper body of the passenger moves furthest from a crash occurring position by pressuring and pushing the second chamber to the first chamber in a indoor direction when the air bag cushion develops, thereby reducing considerably the passenger' injury.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A dual chamber side air bag apparatus comprising:
an inflator mounted to a side of a seat back frame in an outdoor direction;

an air bag cushion fluid-connected to the inflator and including:

a first chamber to push an upper body of a passenger in an indoor direction while developing by a pressure of gas generated from the inflator; and a second chamber mounted at a side of the seat back frame in the outdoor direction and fluid-connected to the inflator and the first chamber so as to protrude and develop toward a front of the seat back frame when the inflator is activated, for protecting side surface of the upper body of the passenger; and a tether having one end thereof fixed to the seat back frame, a mid portion thereof wrapping the first chamber, and the other end thereof sewing-coupled to the air bag cushion in a boundary of the first and second chambers to provide a directivity so that the first chamber develops toward the upper body of the passengers.

2. The dual chamber side air bag apparatus of claim 1, wherein the second chamber supports a side of the first chamber so that the second chamber pushes the first chamber in the indoor direction when the air bag cushion is developed.

3. The dual chamber side air bag apparatus of claim 1, wherein the one end of the tether is integrally coupled to a tether bracket and the tether bracket is mounted to the seat back frame.

4. The dual chamber side air bag apparatus of claim 3, wherein the tether bracket is fixed to an inner side surface of the seat back frame toward the indoor direction in the seat back frame by a fastening member.

5. The dual chamber side air bag apparatus of claim 3, wherein the tether bracket is mounted to be inserted between the air bag cushion and the seat back frame so that the tether bracket is located at an outer side surface of the seat back frame toward the outdoor direction in the seat back frame.

6. The dual chamber side air bag apparatus of claim 5, wherein the tether bracket has a flange portion extending toward the indoor direction so as to induce a developing directivity of the first chamber toward the indoor direction.

7. The dual chamber side air bag apparatus of claim 1, wherein the second chamber is larger than the first chamber.

8. The dual chamber side air bag apparatus of claim 1, wherein the second chamber is supplied with a pressure higher than that of the first chamber.

* * * * *